United States Patent [19]

Yoshikawa et al.

[11] 3,948,657

[45] Apr. 6, 1976

[54] PHOTOSENSITIVE MATTER FOR ELECTROPHOTOGRAPHY AND METHOD OF THE PRODUCTION THEREOF

[75] Inventors: Hideo Yoshikawa; Umi Tosaka; Takehiko Matsuo, all of Tokyo; Hirokazu Negishi, Yokohama, all of Japan

[73] Assignee: Canon Kabushiki Kaisha, Tokyo, Japan

[22] Filed: Oct. 21, 1969

[21] Appl. No.: 868,135

[30] Foreign Application Priority Data

| | | |
|---|---|---|
| Nov. 7, 1968 | Japan | 43-81542 |
| Mar. 20, 1969 | Japan | 44-21404 |
| Mar. 21, 1969 | Japan | 44-21215 |

[52] U.S. Cl. .......... 96/1.5; 96/1.8; 156/90; 156/247; 156/295; 156/315

[51] Int. Cl.$^2$ G03G 5/05; G03G 5/087; B32B 31/06; B32B 31/12

[58] Field of Search ........ 96/1.5, 1.8; 156/325, 332, 156/90, 247, 315, 295; 252/501; 161/406; 117/76 A

[56] References Cited

UNITED STATES PATENTS

| | | | |
|---|---|---|---|
| 2,630,395 | 3/1953 | McCullough | 156/315 |
| 2,672,793 | 3/1954 | Rowe et al. | 156/315 |
| 2,798,021 | 7/1957 | Land | 156/295 |
| 2,901,349 | 8/1959 | Schaffert | 96/1 |
| 3,041,166 | 6/1962 | Bandeen | 96/1 |
| 3,067,078 | 12/1962 | Gluck | 154/43 |
| 3,092,493 | 6/1963 | Kaiser | 96/1 |
| 3,146,145 | 8/1964 | Kinsella | 156/272 |
| 3,170,790 | 2/1965 | Clark | 96/1 |
| 3,251,686 | 5/1966 | Gundloch | 96/1 |
| 3,288,604 | 11/1966 | Consin | 96/1 |
| 3,355,289 | 11/1967 | Hall et al. | 96/1.4 |
| 3,420,914 | 1/1969 | May | 260/837 |
| 3,457,070 | 7/1969 | Watanabe et al. | 96/1.4 |
| 3,547,753 | 12/1970 | Sutton | 161/406 |
| 3,574,667 | 4/1971 | Fournier | 117/76 A |
| 3,687,659 | 8/1972 | Komiya et al. | 96/1.5 |
| 3,801,317 | 4/1974 | Tanaka et al. | 96/1.5 |

*Primary Examiner*—Harold Ansher
*Assistant Examiner*—Charles E. Lipsey
*Attorney, Agent, or Firm*—Watson Leavenworth Kelton & Taggart

[57] ABSTRACT

An electrophotographic photosensitive member is produced by a method in which a photoconductive layer is provided on a base, a polymeric solventless-type liquid resin adhesive is placed between said photoconductive layer and an overlying insulating layer and, by applying pressure on said insulating layer to spread said resin, said insulating layer is secured closely to the photoconductive layer through said adhesive layer. Fine grains of photoconductive material may be dispersed in said adhesive to provide a second photoconductive layer.

14 Claims, 13 Drawing Figures

Figure 1:
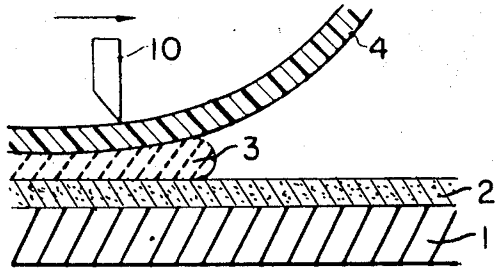

PHOTOSENSITIVE MATTER FOR ELECTROPHOTOGRAPHY AND METHOD OF THE PRODUCTION THEREOF

This invention relates to a method for producing an electrophotographic photosensitive member and further to a method for obtaining a novel photosensitive member by employing said method. More particularly, this invention relates to an electrophotographic photosensitive body comprising basically three layers, a base layer, a photoconductive layer, and an insulating (insulative) layer, and offers a method for producing a photosensitive member whereby excellent results both in smoothness and in uniformity are effectively obtained when installing the photoconductive layer or the insulating layer, and a photosensitive member obtainable through said method.

Furthermore, this invention relates to a method by which an adhesive layer is placed between two layers to be bound, with said two layers then being made to adhere to each other by squeezing.

There have been suggested general methods of installing an insulating layer on a photoconductive layer such as; (1) the insulating film is simply placed on the surface of the photoconductive layer; (2) the insulating film is caused to contact closely the photoconductive layer to laminate them by utilizing the stickiness of the resin binder contained in the photoconductive layer; (3) an adhesive layer is placed between the photoconductive layer and the insulating layer to make them adhere to each other in layers.

However, in the case of method (1), since two layers are only piled in layers, such defects as the trapping of bubbles, an uneven surface, and wrinkles are liable to be produced and since these defects are difficult to remove once they occur, this method can not be said to be an advantageous one.

In the case of method (2), the physical properties of the photosensitive layer itself are affected greatly by the selection of the binder and, even if the selection is appropriate, still there occur many defects especially when the amount of binder selected is small. For example, since the photoconductive layer itself has a porous surface, when coating or bonding an insulating substance on said surface, there occurs easily such conditions as bubbles remaining in the interface between said coating layer and said photoconductive layer, said coating layer being formed unevenly in thickness, and twists or wrinkles being formed partially on the coated surface. When an insulating layer is formed directly on a photoconductive layer, there is the fear that the solvent in the insulating layer will permeate the photoconductive layer to deteriorate the photoconductive body itself or, depending on the kind of solvent, a large amount of solvent permeates the photoconductive layer not only impairing the function of the photoconductive body but also making its surface uneven.

The same phenomena are observed when organic semiconductors are used for the photoconductive layer.

When such phenomena as mentioned above have occurred, a uniform photosensitive element cannot be obtained and, therefore, not only is the function of the photosensitive element reduced, but also nonuniformity in image density and nonuniformity in charging occurs and can not be avoided.

In the case of (3) mentioned above, a photosensitive member excellent in performance as compared with the foregoing two cases can be obtained. However, since the binding agents normally used are sticky at normal temperatures, it is very hard to apply a thin insulating film to the surface of the photoconductive layer without causing wrinkles or bubbles to be produced.

Especially in the case of a tubular insulating film being shrunk by heat upon a drum-shaped photoconductive layer with a sticky adhesive therebetween, since the thermoshrinkage of the insulating film invariably is accompanied by local unevenness, the thermoshrinkage tends to produce wrinkles and capture bubbles produced by the sticky adhesive. A photosensitive member that had experienced the formation of such wrinkles or bubbles was hard to correct and could not be practically used.

Although there are many known kinds of electrophotographic systems, the characteristics of the photosensitive member affects, to a great extent, image formation. By way of example, the present invention is particularly applicable to the electrophotographic systems using a photosensitive element comprising basically three layers, an insulating layer, a photoconductive layer, and a base, such as disclosed, for example, in Japanese Patent Publication No. 23910/1967 and No. 24748/1968, U.S. Ser. No. 571,538 filed Aug. 10, 1966, abandoned in favor of continuation application Ser. No. 116,557 filed Feb. 18, 1971, now U.S. Pat. No. 3,666,363 issued May 30, 1972, July U.S. Ser. No. 563,899 filed Jul. 8, 1966, divided by the filing of divisional application Ser. No. 133,789 filed Apr. 14, 1971, now U.S. Pat. No. 3,801,317 issued Apr. 2, 1974, all owned by the assignee of the present application. The photoconductive layer and the insulating layer must be in very close contact with each other at the interface in these examples.

The charging states in these cases are as follows. The surface of the insulating layer is charged to one polarity by a first charging step and a charge opposite in polarity to the above is bound either to the interface between the photoconductive layer and the contacting insulating layer or in the neighborhood of said interface. Under the influence of this charge, the image of the original is projected onto the photosensitive element simultaneously with further charging through the application of charge of opposite polarity to said one polarity or AC corona discharge, and, when required, a radiation to which the photoconductive layer is sensitive is irradiated over the entire surface of the photosensitive member (i.e., unpatterned radiation) to obtain an electrostatic image on the insulating layer with high contrast.

Therefore, the conditions under which charging occurs determine the quality of the electrostatic image, and such charging conditions at that time are a function of the characteristic of the photosensitive member itself. In a photosensitive member comprising basically a base, a photoconductive layer, and an insulating layer, when the photoconductive layer and the insulating layer are not laminated in close contact with each other, such deficiencies as reduction in the contrast of the electrostatic image, uneven image, and unstable image appear due to the effect of nonuniformity in charge and so forth.

An essential object of this invention is, taking into consideration the above-mentioned facts, to offer a means to bind closely in layers the photoconductive layer and the insulating layer in order to obtain an excellent image.

Specific objects of this invention will be described below. Further objects will also appear from reading the detailed description which follows.

An object of this invention is to provide a photosensitive member having a photoconductive layer and an insulating layer closely bound in layers with a polymer-nonsolvent type synthetic resin and a method for producing same.

A further object of this invention is to provide a method for providing a permeation preventing layer on a photoconductive layer and closely bonding on said permeation preventing layer an insulating layer by using a polymer-nonsolvent type synthetic resin bonding agent and the photosensitive member thus produced.

Another object of this invention is to provide a bonding method with which a polymer-nonsolvent type bonding agent is spread by squeezing and to provide the photosensitive member thus produced.

A still further object of this invention is to provide a method in which, for example, a liquid hotmelt is used as the bonding agent and to provide a photosensitive member produced by using such method.

A specific object of this invention is to provide a way of making a protecting layer to use when squeezing which is peeled off later.

Another specific object of this invention is to provide a way by which the base of the photosensitive member forms a layered structure with the insulating layer and the photoconductive layer in either the stated or reverse order to obtain a multilayered photosensitive member.

This invention will be described in detail in the following.

In providing an insulating layer on the photoconductive layer it is necessary as the most important condition that the insulating layer be bound closely to the photoconductive layer. Laminating with the aid of a bonding agent is one available way to meet this requirement. However, this method heretofore has been limited in its application by the characteristics of the bonding agent itself and by the nature of the insulating layer and the photoconductive layer to be laminated.

In the present invention the conditions set forth for bonding in layers avoids such restrictions. In other words, the feature of this invention lies in the fact that a polymeric solventless-type adhesive is used as the bonding agent.

When photoconductive fine particles are dispersed in a binder resin to form a photoconductive layer, if a solvent type adhesive is used, the solvent of the adhesive permeates into the photoconductive layer and causes local decrease in electrical resistance and disturbs the image quality.

Accordingly, in this invention, affect of adhesive on the photoconductive layer is prevented by the use of a solventless and polymeric adhesive, and at the same time, since polymerization and hardening are accelerated by the presence of a hardener or heat, not only can the photosensitive member itself be in close laminar contact but also mechanical strength of the insulating layer can be achieved.

The solventless polymeric adhesives used here are generally those which give rise to a polymerization reaction and adhesive on heating or through the addition of a hardener or by reaction between the polymer and some constituent of the air or by isolating the polymer from the air. Examples of such adhesives are epoxy resin, unsaturated polyester resin, cyanoacrylate resin, and various kinds of polymeric monomers. Moreover, there are adhesives, called hotmelt type adhesives, such as polyvinylbutyral, polyvinylacetate, vinyl chloride-vinylacetate copolymer resin, vinylacetate-polyethylene copolymer resin, acrylic resin, rosin, phenolic resin, modified phenol resin, maleic acid resin, modified fumaric acid, and dammar rubber having softening points ranging from about 70° to 150°C, and which are transparent and highly insulating. These low-temperature softening resins show no adhesion at normal temperatures. However, they melt by heating them up to the above-mentioned temperatures with infrared rays etc. and become adhesive in character.

As a way of placing the insulating layer on the photoconductive layer in close contact using these adhesives, it is possible to employ the general method by which the insulating layer is merely laid upon the photoconductive layer. However, the following method is provided by this invention to prevent the trapping of bubbles and the occurrence of twists, wrinkles, etc. between the insulating layer and the photoconductive layer.

This invention will be described further with reference to the accompanying drawing, in which:

FIGS. 1 – 5 show schematic cross sectional views of some embodiments of the method of this invention; and FIGS. 6 – 13 show schematic cross sectional views of some embodiments of photosensitive members of this invention.

As shown in FIG. 1, one of the adhesives mentioned above 3 is placed between the photoconductive layer 2 laid on the base 1 and the insulating layer 4, and by means of the squeegee 10 the insulating layer 4 is pressed and squeezed from one end to another in the direction of the arrow to spread out uniformly the pasty adhesive between the insulating film 4 and photoconductive layer 2 and to force out any excessive pasty adhesive from the other end. Smooth squeezing can be attained at this time by placing a lubricant between the insulating film 4 and the squeegee 10 to reduce the friction therebetween.

A squeegee 10 made of rubber, urethane rubber, silicon rubber, etc. works satisfactorily. In practice, squeezing can be performed effectively by using a roller or a blade, for example, a coating knife.

The intensity of the pressure cannot be specified precisely because it depends on the kind of adhesive and the viscosity thereof. However, such pressure as to produce an adhesive layer 10 $\mu$ or less in thickness is adequate.

Figure 2:
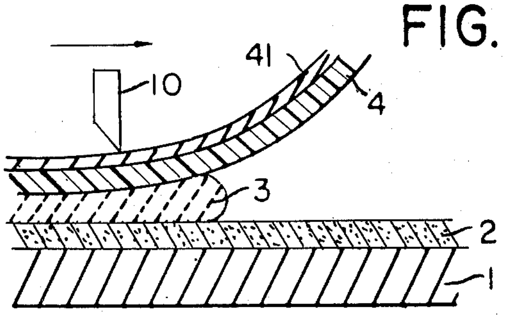
Figure 4:
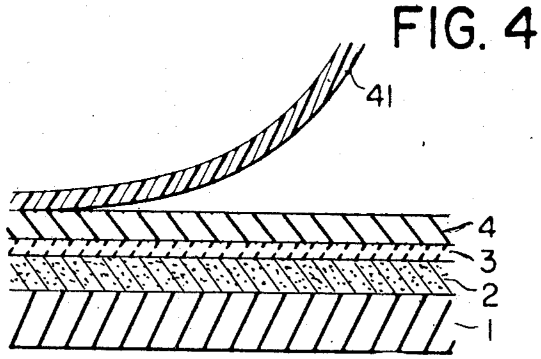

There may be a chance of making small scratches on the insulating layer itself even when using a lubricant, a material resistive to scratching, and appropriate pressure. A very effective way of protecting the insulating layer from such scratches is to provide a protecting layer on the insulating layer. Thus, to obtain a photosensitive member, a protecting layer 41 is provided on the insulating layer 4 as shown in FIG. 2 and the squeegee is applied to the surface of said protecting layer. After completing the formation of the photosensitive member by causing the component layers to be bound in close contact, said protecting layer 41, as shown in FIG. 4, is peeled off. In this manner a photosensitive member in close contact and having a scratchless surface can be obtained. The protecting layer may have no adhesion between it and the insulating layer and its material is of no importance as long as it can be peeled off with ease.

Considering another aspect, several disadvantages are encountered when fine particles of photoconductive material are dispersed in a bonding resin, especially when the amount of the bonding resin is small. For example, the photoconductive layer itself has a porous surface and when the above-mentioned adhesives are applied to the surface of the photoconductive layer, bubbles tend to remain in the interface between the adhesive and said photoconductive layer, said coated layer tends to be formed uneven in thickness, and twists and wrinkles tend to be produced locally on the surface of the coating. As the result, not only the function of the photoconductive body is impaired but also there is a risk of making the surface of the photoconductive layer uneven, and these defects sometimes cause difficulty in forming an image. The same phenomena can be observed when an organic semiconductor is used as the photoconductive substance. When the above-mentioned phenomena occurs, not only is the performance of the photosensitive member impaired, but also the image density becomes uneven and uneven charging is brought about. Thus, it is impossible to obtain a photosensitive member having uniform characteristics.

Therefore, another specific object of this invention is to provide a way of solving the aforementioned problems. One way is to provide a layer which seals the porous surface of the photoconductive layer without an intervening air gap, and also to provide a layer, in order to make the invention applicable to cases wherein the adhesives used are not only the above-mentioned polymeric solventless-type adhesive but also solvent type adhesives, that prevents solvents from permeating into the photoconductive layer. This layer is called the intermediate insulating layer hereinafter.

Figure 3:
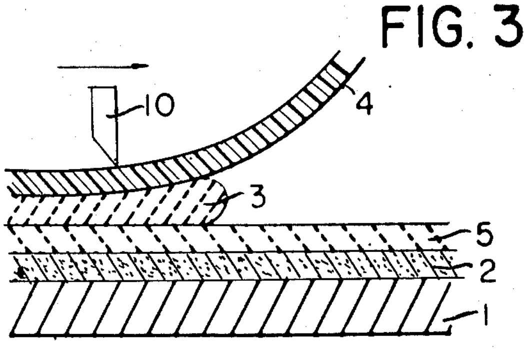

Specificallly, an intermediate insulating layer 5 is provided on the photoconductive layer 2 on the base 1, and the adhesive 3 is placed between said layer 5 and the insulating film 4 as shown in FIG. 3, whereupon the insulating layer 4 is laid on said intermediate layer in close contact by using the squeegee 10 as shown in FIG. 1. In this case the intermediate insulating layer 5 performs a very effective function by entering the porous surface of the photoconductive layer 2 to maintain the smoothness of the surface and becoming a part of the photoconductive layer.

To form the intermediate insulating layer use may be made of such methods as spraying, painting, and spreading by means of a knife, roll, or squeegee, as the occasion may demand. When insulating substances such as resins, silicates, oxides and sulfides of metals, and salts are coated on the photoconductive layer by these methods, the major portion of said insulating material enters the pores of the photoconductive layer while a thin film of insulating material is formed on said photoconductive layer to provide the intermediate layer. The kinds of resin materials used favorably here are those resins which are resistive to the permeance of the substance to be coated upon them, preferably the thermosetting resins. The resins must permeate the photoconductive layer, fill up the porous surface and, at the same time, protect said layer chemically. The relationship between the resin and the bonding material of the photoconductive layer is not important as long as the resin does not impair the performance of the photoconductive layer.

Examples of thermosetting resins that fulfil the aforementioned requirements are epoxy resin, silicone resin, polyester resin, melamine resin, acrylic resin, phenolic resin, urea resin, or the modified resins derived from them. Among them, epoxy resin and unsaturated polyester resin are especially easy to handle and effective because they can be used in liquid form by only mixing a hardener, without using any solvent.

Figure 5:
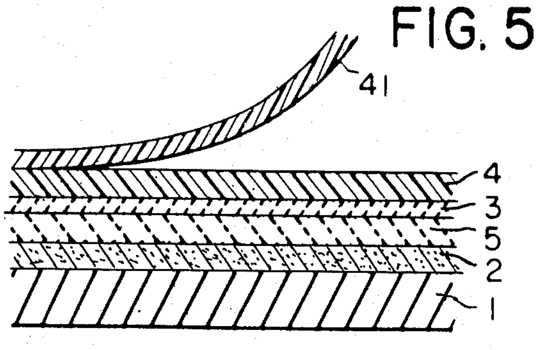

It is desirable to proceed as follows after the curing step when using the foregoing thermosetting resins. After providing the intermediate insulating layer, the main insulating layer is brought into contact with said intermediate insulating layer by means of the aforementioned polymeric solventless-type adhesive or, as shown in FIG. 5, the intermediate insulating layer 5 is provided on the photoconductive layer 2 on the base 1, and the insulating layer 4 is laid on the intermediate insulating layer 5 together with the protecting layer 41 through the adhesive layer 3 and then said protecting layer 41 is peeled off to build a photosensitive member.

So far, a method for laying the insulating layer closely on the photoconductive layer using a polymeric solventless-type adhesive has been described. If the adhesive used for this purpose has the same performance characteristics as that required for the binder of the photoconductive layer, the adhesive can also be used as the binder of the photoconductive layer unchanged.

Figure 6:
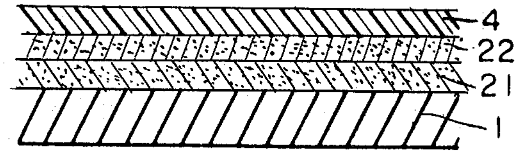

As shown in FIG. 6, a photoconductive layer 21, formed by dispersing photoconductive material in a bonding material, is provided on the base 1 and, at the time of placing the insulating layer 4 upon said photoconductive layer, photoconductive material is dispersed in the adhesive layer 22, i.e., in a polymeric solventless-type liquid resin, before pasting the layers to each other. In this way to photoconductive layer can be divided into two layers. However, by choosing an adequate binder resin for each layer it is possible to make the electric resistance of one layer different from that of the other to improve the image quality and durability of the photosensitive member.

In other words, when employing the electrophotographic system as, for example, disclosed in the aforementioned Japanese Patent Publication No. 23910 (1967) and No. 24748 (1968) and the U.S. application it is specifically required that the photosensitive member have the property of stably binding the charge near the surface of the photoconductive layer during the initial charging step and of holding said charge without attenuation while in the dark. However, although a negative charge on the surface of the photoconductive layer is maintained stably when the photoconductive layer is of n type and a positive charge is similarly maintained when it is of p type, such charge has the general tendency of being attenuated rapidly when the electrical resistance of the photoconductive layer is low and slowly when said resistance is high. Thus an optimum effect cannot be obtained by a single-layered photoconductive layer. Therefore, in the above-mentioned process, it is apparent that a photosensitive member is very effective if its photoconductive layer has a layer with high electrical resistance near its surface and a layer with low electrical resistance below so that the charge of the portion that has undergone light irradiation is easy to move in the lower section (the portion near the base) of the photoconductive layer.

From this point of view, another object of this invention is to provide a way to obtain two photoconductive layers, different from each other in electrical resistance, by converting simultaneously the adhesive layer into a photoconductive layer as mentioned above. In the embodiment of FIG. 6, the upper photoconductive layer 22 has a high electrical resistance compared with a photoconductive layer using a solvent type resin because said layer 22 uses a polymeric solventless-type resin as the binder and electrical charge is bound strongly in the layer in a stable state and is not released in the dark with ease. Since such polymeric solventless-type resin becomes highly rigid when it is hardened by polymerization, the whole photosensitive member becomes firm and its durability is improved. At the same time the ability to secure adhesively the insulating layer 4 in the form of a film is great.

As the underlying photoconductive layer 21, a conventional photoconductive layer is used formed by mixing and dispersing photoconductive particles into a solvent type resin liquid. However, in the case of this invention, it is preferable that this layer have a comparatively low electrical resistance. For this purpose, the ratio of resin component to photoconductive particles is preferably kept small. For example, when cadmium sulfide particles about 1 $\mu$ in diameter is used as the photoconductive material, it is desirable to use about 5 to 20 parts of resin against 100 parts of cadmium sulfide.

On the other hand the ratio of resin in the upper layer 3 (22) when 100 parts of the same cadmium sulfide is used is preferably 20 to 100 parts. Due to the absence of solvent, layer formation is difficult when less than 20 parts resin is used with 100 parts cadmium sulfide. And when the relative amount of the resin exceeds 100 parts per 100 parts cadmium sulfide, the layer so formed becomes nearly an insulating layer and is unsuitable to our purpose. To produce such a photosensitive member there are the rolling methods by which a polymeric solventless-type resin 22 in which photoconductive substance is dispersed is placed between a lower photoconductive layer 21 and an insulating layer and is spread by a squeegee, and the spreading method in which a protecting layer is provided and then squeezed as mentioned above. By these methods it is possible to laminate the insulating layer closely together with the two-layered photoconductive layer.

The polymeric solventless-type adhesives mentioned before are used unchanged as the binder resin in the upper part 22 of the photoconductive layer. In most cases, a polymerizing agent, catalyst, or accelerating agent is added to said adhesive in order to cause polymerization after the layer formation. Such resins as epoxy resin are polymerized together at time of polymerization if only a small amount of solvent is added to them.

The ratio of resin to photoconductive particles in the upper layer 22 varies with the oil absorption (which depends on the surface area and the grain size) of the photoconductive body. However, generally speaking, a pasty consistency cannot be obtained and layer formation is hard to achieve if the amount of the resin is not greater than that in the lower layer 22. Increase in the amount of resin increases the electrical resistance of the layer and results in a favourable characteristic with negligible escape of trapped electric charge in the dark.

On the other hand, the binder resins used in the lower layer 21 of the photoconductive layer are preferably of comparatively low electrical resistance. However, resins of high electrical resistance can also be used by controlling the mixing amount. For example, there are many kinds of resins available such as the copolymer resin of vinyl acetate and vinyl chloride, polyvinyl acetate, nitrocellulose, methacylic resin, epoxy resin, urethane resin, alkyd resin, melamine resin, acrylic resin, and silicon resin.

The ratio of the resin to the photoconductive material varies with the kind of resin. However, a ratio of 5 to 40% is preferable. As a binder in the aforementioned system where the photoconductive layer comprises a single layer, those binders specifically enumerated can be used satisfactorily and, of course, binder resins in wide conventional use can be used successively. Although those resins having an extremely low electrical resistance must be avoided, resins having conventional photoconductive properties which are in common use can be used without any trouble.

As for the photoconductive substance, it is not limited by whether the photoconductive layer comprises two layers or a single layer, and the same substance is applicable to both cases. As photoconductive substances to be dispersed in the binder, there are ZnO, $TiO_2$, CdS, CdSe, ZnS, ZnSe, etc. and in general the diameter of their grain is between 0.1 and 0.5 $\mu$.

Especially CdS has not only a high practicality because grains with a small diameter can be obtained and it has a high electrophotographic sensitivity, but it also yields a special effect in this invention.

In the case where the photoconductive grains are not dispersed in the binder of the system but the photoconductive grains are evaporated or painted independently on another component of the photosensitive element, alloys contaning three or more than three of the elements of, for example, Se, Se-Te, Ge, Si, and evaporated CdS may be used. In addition, organic semiconductors applicable to this invention can all be used.

Next, as the insulating layer where adhesion is achieved using a polymeric solventless-type liquid resin, those resins capable of holding electrical charge and passing rediation to which the photoconductive substance is sensitive, can be used successfully. For example, polyester, polyvinylchloride, polypropylene, polyvinylidenechloride, polycarbonate, polystyrene, polyamide, polyfluoroethylene, polyethylene, polyimide, polyvinylfluoride, polyvinylidene fluoride, polyvinylidene chloride, etc. may be used for the purpose.

No limitation is placed on the material used as the protecting layer on the film of the above-mentioned substances, but rubber, urethane, and silicon rubber can be mentioned as giving an excellent result.

Next, as the material for the base, beside a unitary conductive substance, a combination between it and an insulating material may be considered. Thus, the base may be composed of, for example, only an insulating substance, or a conductive body formed on an insulating one, or the reverse combination. However, in the present invention, metals, metal foils, paper, and other things which are electrostatically conductive can be used as the conductive material and, as the insulating material, such materials as resin films, wood, glass, ceramics, etc. that can be used as the base suffice our purpose.

As for the combination between the insulating layer and the conductive layer, either the insulating material is coated on the conductive layer to form the base or a conductive substance is evaporated or coated on the insulating material to form the base. The base thus formed can, of course, be used in flat plate form, but its shape can be determined optionally depending on the shape of the photosensitive member desired. For example, since this invention is effectively applicable to a cylindrical photosensitive member, it gives a good result when the base is shaped in a drum form.

The invented photosensitive member produced with the above-mentioned materials will be further described by referring to the attached drawings.

Figure 7:
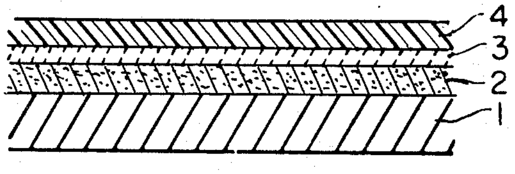
Figure 8:
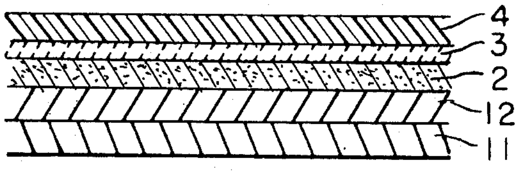
Figure 9:
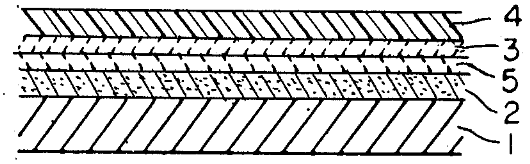
Figure 10:
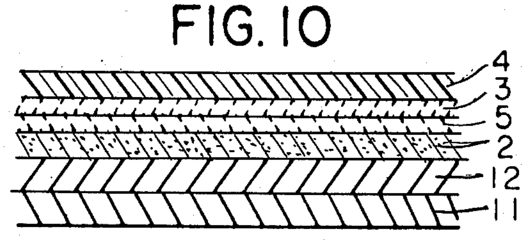

The most elementary construction of the photosensitive member according to this invention is, as shown in FIG. 7, comprising a base 1, a photoconductive layer 2, an insulating layer 4 placed on the base 1, and a polymeric solventless-type adhesive layer 3 inserted between the photoconductive layer 2 and the insulating layer 4. As a modification of this, the base comprises two layers as shown in FIG. 8 where the base contains, for example, a conductive layer 11 and an insulating layer 12. Alternatively, as mentioned above, the formation may be reversed. FIG. 9 shows another embodiment of this invention. Here an intermediate insulating layer 5 is provided on the photoconductive layer 2 and then an insulating layer 4 is applied with the aid of the adhesive layer 3 as shown in FIG. 7. Moreover, the base 1, beside consisting of solely a conductive substance may have a construction in which it is replaced by a conductive layer and an insulating layer as shown in FIG. 10, if desired.

On the other hand, as has already been mentioned, a photosensitive member having a photoconductive layer comprising two layers can be represented by the construction shown in FIG. 6 where the said member is composed of the base 1, photoconductive layer 21 having a low electrical resistance, photoconductive layer 22 having a high electrical resistance, and the insulating layer 4. Of course, there are cases wherein the base 1 is composed of plural layers similar to the above description. The descriptions given so far are concerned with the case wherein the photosensitive member is in a flat plate form. From the pont of view of practical use, it is extremely advantageous in continuous copying and smooth copying to form the photosensitive member in a cylindrical form.

Some examples of cylindrical photosensitive members will be shown here. However, it is stated expressly that the electrophotographic photosensitive members that have the constructions mentioned so far can all work effectively as cylindrical photosensitive members.

Figure 11:
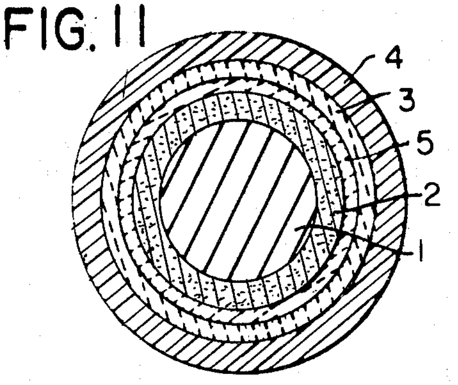

FIG. 11 shows that flat photosensitive member shown in FIG. 9 formed into a cylinder where, upon the cylinder 1 that serves as the base, the photoconductive layer 2, the intermediate insulating layer 5, the adhesive layer 3, and the insulating layer 4 are formed in sequence. As a method for producing the photosensitive member, for example, the squeezing method, can be used directly.

Figure 12:
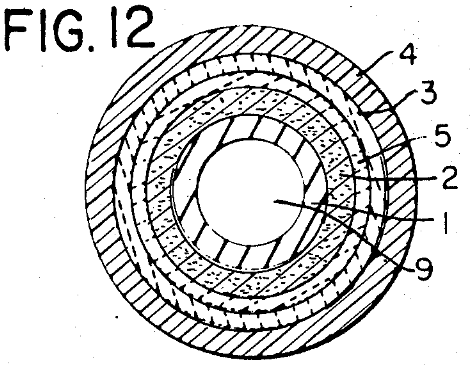

Although in this case the original pattern is irradiated on the insulating layer 4, in other words from outside of the photosensitive member, when, as an exposure system, the original pattern is irradiated from the inside of the cylindrical photosensitive member, the construction shown in FIG. 12 is desired. Here, the layer formation itself is the same as that shown in FIG. 11, that is, the layers are piled from outside in the order of insulating layer 4, adhesive layer 3, intermediate insulating layer 5, photoconductive layer 2, and base 1. It is required here that a space 9 be provided within the base 1, and the base 1 must pass the radiations to which the photoconductive body is sensitive. Although in practice it is advantageous to form an electrostatic image on the insulating layer 4 forming the external wall, it is possible, theoretically, to form it on the base 1.

Figure 13:
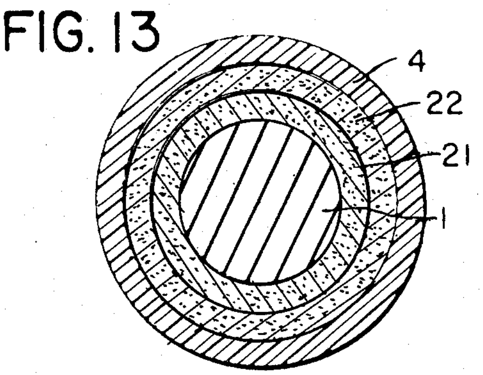

It is of course possible to use as the base 1 a conductive layer and insulating layer either singly or in combination according to the need. In another example the photoconductive layer comprises two layers. FIG. 13 shows in cylindrical form the same construction as the one shown in FIG. 6. The photoconductive layers 21 and 22, which use binders of different electrical resistance, are provided on the base 1, and the insulating layer 4 is secured intimately on the photoconductive layer 22, which uses a binder of higher resistance, by the adhesiveness of the binder. In this case also, like FIG. 12 referred to before, the center part of the cylinder may be made hollow and a material which passes the radiations to which the photoconductive body is sensitive may be used to build the base.

As was mentioned above, the photosensitive member according to this invention may have a variety of layer formations. However, as long as they are provided by the techniques disclosed in this invention, they are all included in this invention.

As representative of the electrostatic image forming processes of electrophotography employing electrophotographic photosensitive members according to this invention, there are two processes disclosed in the aforementioned Japanese Publication No. 23910/1967 and No. 24748/1968, and the U.S. applications. However, many other processes can also be employed.

Several examples of electrostatic image forming processes are as follows:

1. Primary charging secondary charging opposite in polarity to the primary charge with simultaneous exposure whole surface irradiation.

2. Charging AC corona discharge with simultaneous exposure whole surface irradiation (if required).

3. Charging with simultaneous exposure whole surface irradiation.

4. Primary charging secondary charging of opposite polarity exposure tertiary charging of opposite polarity to primary charging whole surface irradiation.

This invention is effectively applicable to other electrophotographic processes as long as they use a photosensitive member having an insulating layer on the photoconductive layer. In every instance, a good quality image is obtainable when the insulating layer is 50 $\mu$ or less in thickness.

This invention will be described now more in detail referring to the following examples. It is to be understood, however, that the mode of application of this invention shall not be limited to these examples and all modes are applicable as long as they embody the inventive ideas contained herein.

EXAMPLE 1

On aluminum foil 30 $\mu$ thickness, was coated a fluid obtained by dispersing completely 100 parts of photoconductive CdS grains 1 $\mu$ in average diameter in 20 parts binder such that the dry thickness is about 80 $\mu$, dried, to form a photoconductive layer.

A polyester film 25 $\mu$ thick was laid on the photoconductive layer. Between the film and the photoconductive layer was sandwiched an adhesive prepared by adding 10 parts of the hardener K – 61B (trade name, product of Anchor Chemical Co.) to 100 parts of epoxy resin Epikote 815 (trade name, product of Shell Petroleum Co.) to which was added 6 parts of fine grain silica followed by completely mixing and kneading. Then the adhesive was spread by squeezing the surface of the film from one end with a squeegee made of urethane rubber and the excess adhesive was forced out of the other end. The squeezing pressure was adjusted so that the thickness of the adhesive was about 5 μ. The adhesive layer was then cured for 3 hours at 70°C and a photosensitive member was produced. The photosensitive member thus obtained was free from bubbles and wrinkles and was flat with its insulating film in uniform and even contact with the photoconductive layer.

On the surface of the photosensitve member thus obtained, positive corona discharge was applied followed by simultaneous image irradiation and discharging by means of AC corona discharge. Then the whole surface was exposed to light to obtain an electrostatic latent image. The latent image was developed by the magnetic brush method using a negative toner and a sharp image with high contrast was obtained. After transferring the image to another piece of paper the photoconductive member was subjected to a cleaning process. Cycling of the above-mentioned process was repeated for 10,000 times. Since the epoxy resin in the adhesive becomes very hard after hardening, the insulating layer had a very favorable mechanical strength, and received no particular damage during the 10,000 test cycles and the quality of the image was almost unchanged.

EXAMPLE 2

The photoconductive layer was formed by a coating method similar to *Example* 1. Next, the adhesive used in the adhesion of the polyester film in *Example* 1 was coated thinly on the surface of the photoconductive layer by squeegeeing with a squeegee made of urethane rubber followed by heating and hardening to form first a permeation preventing layer. During this step a portion of the adhesive permeated into the photoconductive layer and the permeation preventing layer was about 3 μ thick.

Next by using the same adhesive as *Example* 1 and by following the same procedure a polyester film 25 μ thick was laid in close contact with the photoconductive layer and the adhesive was hardened to obtain a photosensitive member. The photosensitive member thus obtained was free from bubbles and wrinkles and was flat like the one obtained in

EXAMPLE 1.

Next, using this photosensitive plate, an image was formed by following the same procedure as *Example* 1 and the 10,000 cycle test was also conducted. The image quality was as good as that obtained in *Example* 1 and the durability of the photosensitive plate was as good as the one obtained in *Example* 1.

EXAMPLE 3

Coating of the photoconductive layer was accomplished after reducing the ratio of the binder to 100 parts of CdS in the photoconductive layer of *Example* 1 from 20 parts down to 10 parts. Directly on the surface of the photoconductive layer was applied a polyester film using the squeegee similar to *Example* 1. Formation of bubbles was observed locally. Therefore, the film was peeled off before the adhesive was hardened and the film was applied to the photosensitive layer again after adding adhesive between them and by then squeezing with the squeegee. By doing this, the bubbles that were formed were driven out completely and a uniform photosensitive member was produced.

EXAMPLE 4

On an aluminum plate 1 mm thick was vacuum evaporated amorphous Se to a thickness of about 50 μ while cooling the aluminum plate. Then, upon the layer of Se was applied a polyester film 12 μ thick following the same procedure as *Example* 1 and using the epoxy adhesive. The adhesive was then hardened and a photoconductive member was obtained. The photosensitive plate was flat, having no bubbles and wrinkles.

A negative corona discharge was applied to the surface of the photosensitive member followed by simultaneous image irradiation and the application of positive corona discharge, then the whole surface was subject to light irradiation to form an electrostatic latent image. The latent image was next developed by the magnetic brush method using a positive toner, and a sharp image of high contrast was obtained. Also in this photosensitive member, the epoxy resin used as the adhesive worked to increase the mechanical strength of the insulating layer and the insulating layer showed little damage after 10,000 times repeated use.

Sticking of a film on a surface of Se is liable to result in small bubbles being produced when the general methods in common usage are employed. However, by using this method, uniform adhesion was possible without producing any bubbles.

EXAMPLE 5

The same result was obtained when unsaturated polyester resin was used instead of epoxy resin in *Example* 1.

EXAMPLE 6

On a photoconductive layer prepared by dispersing CdS in epoxy resin was coated a 10% ethanol solution of polyvinylbutyral (for example, Esleck MB-2 of Sekisui Co.) and dried to form a hotmelt adhesive layer. A polyester film 25 μ thick was laid over the adhesive layer, heated and pressed to form an electrophotographic photosensitive member in plate form.

Reproduction was carried out by using this electrophotographic photosensitive member in plate form in a copier employing, for example, the electrophotographic method shown in *Example* 1. and a good quality reproduction was obtained.

EXAMPLE 7

By mixing and dispersing activated cadmium sulfide grains of about 1 μ in average diameter in 10% by weight of vinyl acetate resin a mixture was produced which was coated to a thickness of 70 μ on aluminum foil 30 μ thick.

Next, to 100 parts of No. 815 epoxy resin of Shell Petroleum Co. were added 100 parts of cadmium sulfide and 10 parts of K61B hardener of Anchor Chemical Company. The mixture was kneaded to produce a pasty mixture. This mixture was placed between the above-mentioned photoconductive layer formed on the aluminum foil and a 25 μ thick polyester film that was to become the insulating layer and, by squeezing the film with a rubber squeegee to squeeze out the excessive paste, a paste layer of uniform thickness was obtained. (The pasty mixture layer was produced with a thickness of about 10 μ at this time). Next, by thermally setting the pasty layer for 1 hour at 70°C, a photosensitive layer was obtained.

On the photosensitive member was applied a positive 6KV corona discharge and then simultaneous irradiation of an optical image with AC corona discharge. Next, the whole surface as exposed to light to obtain an electrostatic latent image. The latent image was developed by the magnetic brush method using a developer containing negative toner. A sharp image with high contrast was obtained.

The photosensitive member was free from bubbles and wrinkles, was flat and rigid, and was strong and highly sensitive.

EXAMPLE 8

An insulating layer was obtained by first peeling off the polyester film from the photosensitive member produced in *Example* 7 and in its place a coating of epoxy resin and clear paint was applied by spraying on the photosensitive layer to a thickness of about 30 μ. The layer was hardened thermally at 150°C for 1 hour, and thus an insulating layer was formed.

The image obtained by using this photosensitive member and by following the same procedure as *Example* 7 was sharp and of high contrast. Since this photosensitive member had a hard surface of thermosetting resin, it was especially good with respect to durability.

EXAMPLE 9

A photosensitive member was produced by using unsaturated polyester resin (Rigolac 2004 produced by Riken Goseikako Co.) instead of the epoxy resin used in *Example* 7.

As a result of following the same procedure as *Example* 7 using this photosensitive element, an image of high contrast like the one obtained in *Example* 7 was obtained.

The photosensitive member was flat, free from bubbles and wrinkles, rich in rigidity, strong, and highly sensitive.

EXAMPLE 10

On a size A4 flat aluminum plate 1 mm thick was coated by spraying a mixture prepared by dispersing uniformly 100 parts of photoconductive cadmium sulfide having an average diameter of 1 μ into 50 parts (containing 10 parts of solid matter) of the copolymer solution of vinylchloride and vinyl acetate so that the thickness after drying was about 60 μ. After drying, a polymeric liquid form resin prepared by mixing 20% of H-92 hardener of Nihon Goseikako Co. with epoxy resin 815 of Shell Petroleum Co. was squeegeed on the surface of the photosensitive layer with a rubber squeegee to produce a uniform thin coating of the resin solution. By this treatment, the porous surface of the photosensitive layer was filled with the above-mentioned resin solution and a thin resin layer was formed on the photosensitive layer. The liquid resin was then hardened by curing at 70°C for 2 hours. Next a polyester film 25 μ thick was applied to the surface of the resin layer using the same 815-H-92 liquid resin. At this step the excessive resin was forced out from one side by squeezing the film with a rubber squeegee so that an adhesive layer 2 to 5 μ thick was produced. In conventional processes where prior filling of the pores was not accomplished, during this step the adhesive permeated into the photoconductive layer and caused the photoconductive layer to become nonuniform in property. However, such things never happened in the case of this method. Next, the resin was hardened for 2 hours at 72°C and thus the desired photosensitive member was obtained.

Next, a corona discharge of positive 6KV was applied to the surface of the photosensitive member followed by simultaneous negative 6KV corona discharge and irradiation of the optical image having an intensity of about 3 lux seconds and then the entire surface was subjected to an irradiation of light. The latent image thus formed was developed by the magnetic brush method using a negative toner. An extremely good quality image as obtained. After this, the image was transferred to another paper by pressing, the toner remaining on the photosensitive member was wiped off. The photosensitive member was subjected to repeated cycling of the above-mentioned procedure. A good quality image was obtained each time. Since the photosensitive member produced by this method used epoxy resin, it had a favorable mechanical strength.

EXAMPLE 11

By using as the adhesive for the insulating layer a hotmelt type adhesive composed mainly of vinylchloride in place of the epoxy resin of *Example* 10, adhesion was carried out while heating. A result almost similar to *Example* 10 was obtained. In this case also, almost all the hotmelt adhesive permeated into the porous surface of the photoconductive layer in cases where no measures were taken to prevent the permeation.

EXAMPLE 12

A melamine resin clear paint containing hardener was used in place of the permeation preventive treatment using the epoxy resin in *Example* 10 and permeation preventive treatment was carried out by coating said clear paint thinly by spraying, followed by curing by heating for 2 hours at 90°C.

The result obtained was almost the same as obtained in the case of *Example* 10.

EXAMPLE 13

Instead of applying the polyester film in *Example* 10, a melamine resin clear paint containing hardener was coated by spraying to a thickness of about 25 μ, and then hardened by heating for 2 hours at 90°C.

The image obtained was of good quality and, since a thermosetting resin was used, the mechanical strength of the surface of the photosensitive member was extremely remarkable. In this case also, when no permeation preventive means was taken, the permeation of melamine resin was extensive and a uniform insulating layer was difficult to obtain.

EXAMPLE 14

The same result as obtained in *Example* 13 was obtained by using a one solution type epoxy resin paint Acmex V-56B (product of Nihon Goseikako Co.) in place of the melamine resin clear paint in *Example* 13 and by hardening for 4 hours at 120°C.

EXAMPLE 15

The same good result as obtained in *Example* 10 was obtained by carrying out the permeation preventive process by coating and permeating a liquid prepared by dispersing fine grains of silicon oxide into water in place of carrying out the permeation preventive process of *Example* 10.

What is claimed is:

1. An electrophotographic photosensitive member comprising in integral relationship a base, a layer of photoconductive material on said base, on the surface of said layer of photoconductive material which is remote from said base, a layer no more than 10 $\mu$ thick of cured polymeric solventless-type resin adhesive containing dispersed therein fine grains of a photoconductive material having the same composition as the photoconductive constituent in said layer of photoconductive material, and a pellicular layer of insulative material overlying said layer of adhesive secured adhesively thereby, said first mentioned layer of photoconductive material consisting essentially of a mixture of said photoconductive constituent with a resin binder, and said polymeric solventless-type liquid adhesive is present in said layer of cured adhesive in greater proportion to said fine grains of photoconductive material than said resin binder is present in said layer of photoconductive material in relation to said photoconductive constituent such that said layer of adhesive has an appreciably higher electrical resistance than said first mentioned layer of photoconductive material.

2. An electrophotographic photosensitive member as set forth in claim 1, wherein said polymeric solventless-type adhesive resin belongs to the epoxy family.

3. An electrophotographic photosensitive member as set forth in claim 1, wherein said base consists essentially of conductive material.

4. An electrophotographic photosensitive member as set forth in claim 1, wherein said base consists essentially of insulating material.

5. An electrophotographic photosensitive member as set forth in claim 1, wherein said base consists essentially of a layer of insulating material and a layer of conductive material with said layer of conductive material being sandwiched between said last mentioned layer of insulating material and said layer of photoconductive material.

6. An electrophotographic photosensitive member as set forth in claim 1, wherein said base consists essentially of a layer of insulating material and a layer of conductive material with said last mentioned layer of insulating material being sandwiched between said layer of conductive material and said layer of photoconductive material.

7. An electrophotographic photosensitive member as set forth in claim 1, wherein said base is drum-shaped.

8. An electrophotographic photosensitive member as set forth in claim 1, wherein said base is in the form of a hollow drum.

9. A method for producing an electrophotographic photosensitive member comprising the steps of applying, to the exposed surface of a layer of photoconductive material on a base, a localized quantity of a polymeric solventless-type liquid resin adhesive containing dispersed therein fine grains of a photoconductive material having the same composition as the photoconductive constituent in said layer of photoconductive material, laying over said adhesive a pellicular layer of insulative material, and applying pressure with a traveling motion to the exposed surface of said pellicular layer to spread said adhesive uniformly between said respective layers of photoconductive and insulative material to create a second photoconductive layer 10 $\mu$ thick which simultaneously bonds said pellicular to said first mentioned layer of photoconductive material, said polymeric solventless-type liquid adhesive being a resin belonging to the epoxy family and used in sufficient quantity to cause said second photoconductive layer to have an appreciably higher electrical resistance than said first mentioned layer of photoconductive material.

10. A method for producing an electrophotographic photosensitive member comprising the steps of applying, to the exposed surface of a layer of photoconductive material on a base, a localized quantity of a polymeric solventless-type liquid resin adhesive containing dispersed therein fine grains of a photoconductive material having the same composition as the photoconductive constituent in said layer of photoconductive material, laying over said adhesive a pellicular layer of insulative material, and applying pressure with a traveling motion to the exposed surface of said pellicular layer to spread said adhesive uniformly between said respective layers of photoconductive and insulative material to create a second photoconductive layer 10 $\mu$ thick which simultaneously bonds said pellicular layer to said first mentioned layer of photoconductive material, said first mentioned layer of photoconductive material being produced by mixing said photoconductive constituent with a resin binder and applying the mixture to said base, and said polymeric solventless-type liquid adhesive being employed in greater proportion to said fine grains of photoconductive material than said resin binder is in relation to said photoconductive constituent whereby said second photoconductive layer is formed with an appreciably higher electrical resistance than said first mentioned layer of photoconductive material.

11. A method for producing an electrophotographic photosensitive member comprising the steps of coating the exposed surface of a layer of photoconductive material on a base with a liquid polymeric material and curing said polymeric material to provide a layer of insulative material impermeable to polymeric solventless-type liquid resin adhesive material for sealing the surface of said layer of photoconductive material, thereupon applying, to the exposed surface of said impermeable layer, a localized quantity of a polymeric solventless-type liquid resin adhesive, laying over said adhesive a pellicular layer of insulative material, and applying pressure with a traveling motion to the exposed surface of said pellicular layer of insulative material to create an adhesive layer by spreading said adhesive uniformly between said impermeable layer and said pellicular layer and to bring said pellicular layer into intimate contact with the layer of adhesive thus formed and within 10 $\mu$ from said surface of said impermeable layer.

12. A method as set forth in claim 11, wherein the polymeric solventless-type liquid resin is an epoxy resin.

13. A method as set forth in claim 11, wherein said pressure is applied by squeezing said pellicular layer from one end to the opposite end toward said impermeable layer by using a squeegee to spread and force out excessive adhesive resin and bring said layers of insulative material close together, and wherein said localized quantity of adhesive is applied beneath said one end.

14. A method as set forth in claim 13, wherein a protecting layer of material is first placed on said pellicular layer, then said squeegee is applied to said protecting layer to apply said pressure therethrough, and thereafter said protecting layer is removed.

* * * * *

UNITED STATES PATENT OFFICE
CERTIFICATE OF CORRECTION

PATENT NO. : 3,948,657

DATED : April 6, 1976

INVENTOR(S) : Hideo Yoshikawa et al.

It is certified that error appears in the above-identified patent and that said Letters Patent are hereby corrected as shown below:

Column 2, line 29, "July U.S. Ser. No." appearing in bold face type, should read --and U.S. Ser. No.-- in standard type.

Column 3, line 66, "adhesive" should read --adhesion--.

Column 5, line 34, "adhesive" should read --adhesives--.

Column 6, line 35, "to" (second instance) should read --the--.

Column 7, lines 23 and 24, "in diameter is used as the photoconductive material, it is desirable to use about" appearing in bold face type should read in standard type.

Column 8, line 32, "contaning" should read --containing--.

The symbol -- ⟶ -- to symbolize "followed by" should be inserted at each of the following locations in Column 10: line 32, after "charging" (first instance); line 34, after "exposure"; line 35, after "Charging"; line 36, after "exposure"; line 38, after "exposure"; line 40, after "charging" (first instance); line 41, after "polarity"; same line, after "exposure"; and line 42, after "charging".

Column 11, line 49, after "in" insert in italics --Example 1.--; line 51, the heading "EXAMPLE 1." should be deleted.

Column 13, line 7, "as" should read --was--.

Column 15, line 66, before "10" insert -- $\leq$ --; line 67, after "lar" insert --layer--.

Column 16, line 20, before "10" insert -- $\leq$ --.

Signed and Sealed this

Ninth Day of November 1976

[SEAL]

*Attest:*

RUTH C. MASON
*Attesting Officer*

C. MARSHALL DANN
*Commissioner of Patents and Trademarks*